May 10, 1932.  E. EGER ET AL  1,857,144

TIRE

Filed March 28, 1930

INVENTORS
*Ernst Eger*
*Sheldon P. Thacher*
ATTORNEY

Patented May 10, 1932

1,857,144

UNITED STATES PATENT OFFICE

ERNST EGER AND SHELDON P. THACHER, OF DETROIT, MICHIGAN, ASSIGNORS TO MORGAN & WRIGHT, OF DETROIT, MICHIGAN, A CORPORATION OF MICHIGAN

TIRE

Application filed March 28, 1930. Serial No. 439,580.

Our invention relates to automobile tires, and more particularly to inner tubes for use with drop center rims.

At the present time a type of automobile rim, known as the drop center rim, is becoming popular because of its simplicity and adaptability to wheels in general. Such a rim is provided with a relatively deep groove or depression into which segments of tire beads are inserted to permit the diametrically opposite segments of the tire to be placed over the opposite shoulders of the rim. Upon inflation of the tire, the beads are forced out of the groove and into their normal seats. As heretofore used, the inner tubes in tires mounted on such rims have been of the conventional type having walls of substantially uniform thickness.

However, such a rim and tire construction is objectionable because if the car is moving and the tire becomes deflated, the beads along segments of the tire are liable to drop into the groove at the center of the rim. Such a condition frequently causes the tire to completely leave the rim. More frequently the inner tube creeps out from within the casing and becomes pinched and distorted, and in many cases totally ruined. The foregoing conditions may occur in a very short space of time and are often affected before the car can be stopped or before the deflated tire becomes evident to the driver. Upon the occurrence of one of such contingencies, a car traveling at high speed may be thrown out of control of the driver with disastrous results.

To prevent the foregoing difficulties, we provide an inner tube for use with drop center rims in which the tube normally fills the depression in the rim so that the beads of the tire cannot accidentally slip into the depression at the center of the rim. This construction, to a considerable degree, prevents the possibility of the tire flying off the rim or of the inner tube becoming pinched between the rim and the beads. An inner tube embodying our construction is provided with radially thickened segments at its inner circumference, which segments are normally seated in the groove at the center of the rim. The inherent resiliency of the tube causes these segments to remain seated in the groove under conditions of deflation, thereby preventing the beads of the tire from dropping into the groove on one side and flying off the rim at a diametrically opposite area.

The accompanying drawings illustrate the conventional inner tube now in use and a present preferred embodiment of our invention in which.

Figure 3:
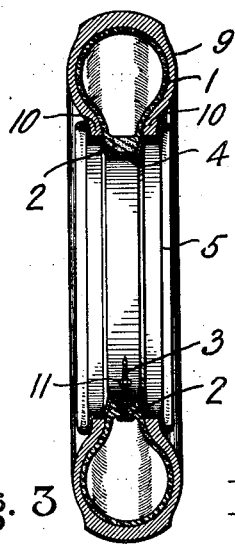
Fig. 3 is a cross sectional view of a drop center rim, tire casing and inner tube embodying our invention.
Figure 1:
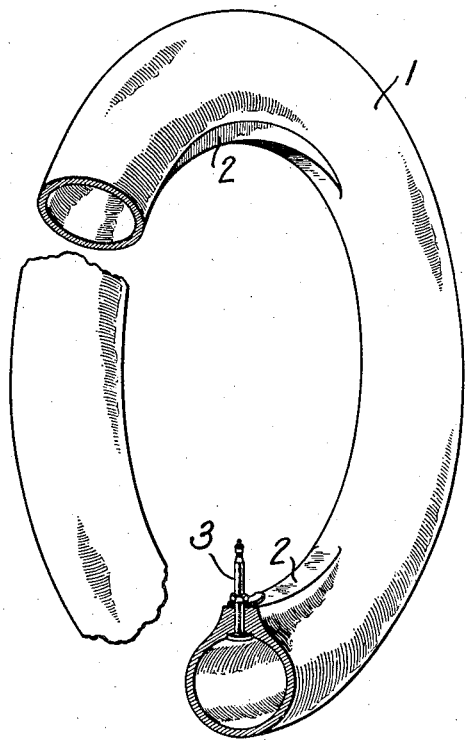
Figure 1 is a broken perspective view of an inner tube embodying our invention.

Referring to the drawings, Fig. 1 illustrates an inner tube 1 of rubber having segmental portions 2 disposed along its inner circumference and the usual valve stem 3. The inner surfaces of the segmental portions 2 are shaped to fit the groove 4 in a drop center rim, as illustrated in Fig. 3. While we have shown two such segments, it is obvious that the invention is not limited to a pair of segments. The lengths of the segments are determined by the ease of removing a tire from a rim. By using two or more segments 2, the balancing of the tube is maintained more satisfactorily than where a single long segment is used.

The segments 2 may be manufactured integrally with the tube or the segments may be separably prepared and vulcanized or cemented to the tube. Where the segments 2 are separately prepared and attached to a tube, a cheaper grade of rubber may be used for the segments than is used in the body of the tube proper. The valve stem 3 is preferably located at the center of one of the segments.

As shown in Fig. 1 of the drawings, the rim engaging surfaces of both the segments and the tube proper gradually merge with each other, in such manner that when the tube is inflated either inside or outside of the tire casing, or on or off of the rim, they naturally assume a circular configuration with a consequent elimination of any distortion and wear on the tube near the ends of the segments.

Figure 2:
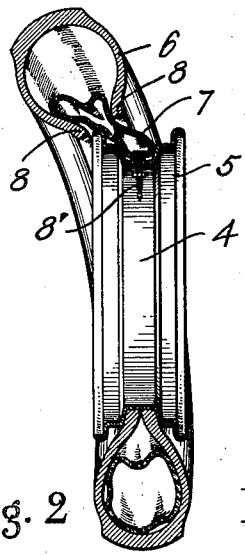
Fig. 2 is a cross sectional view of a conventional inner tube, tire and drop center rim.

Referring to Fig. 2, there is illustrated a tire 6 and a conventional inner tube 7 mounted on a drop center rim 5. A valve connection 8' extends through the rim 5 in the usual manner. When a tire provided with the inner tube 7 becomes deflated, the beads 8 of the tire slip into the groove 4 at one side of the tire and permit the beads 8 to jump out of the rim along other segments. This is a dangerous condition as the tire 7 may completely leave the rim with a danger of the machine getting out of control or the inner tube may be ruined by being pinched between the beads 8 and the rim 5.

Figure 4:
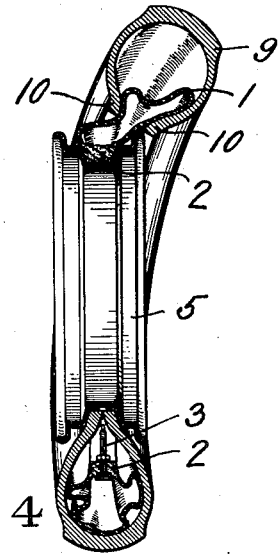
Fig. 4 is a cross sectional view of the section shown in Fig. 3 illustrating a method of removing a tire from the rim.
Figure 5:
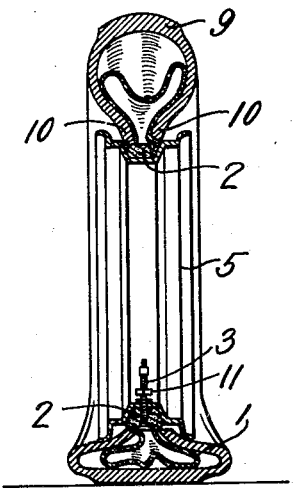
Fig. 5 is a similar view of the construction shown in Fig. 3 in a deflated condition.

Referring to Figs. 3, 4 and 5, there is illustrated a tire 9 which is mounted on a drop center rim 5 and which is provided with an inner tube 1 having segmental portions 2 for preventing the beads 10 of the tire 9 from dropping into the groove 4. As shown in Fig. 3, the inflated inner tube 1 is disposed with the segments 2 in the groove 4 and with the valve stem 3 projecting through the usual opening in the rim. A clamping washer 11 is threaded on the valve stem 3 to firmly engage the inner surface of the rim. For convenience, the washer 11 is shown as being slightly removed from the rim, although in service the washer 11 firmly engages the rim. In this position the resiliency of the inner tube keeps the segmental portions 2 in the groove 4. The presence of the segmental portions in the groove prevents the beads of the tire from slipping into the groove should the tire become punctured, as illustrated in Fig. 5. Since the tire 9 cannot slip into the groove 4 of the rim 5, the tendency for the tire beads 10 to jump out of the rim 5, in the manner illustrated in Fig. 2, is prevented.

Referring to Fig. 4, when it is desired to dismount the tire 9, the washer 11 is removed and the valve stem 3 is pushed back into the tire 9, thereby removing one of the sections 2 from the groove. The removal of the section 2 permits the adjacent beads 10 to slip into the groove, thereby displacing the tire relative to the center of the rim so that the diametrically opposite beads 10 can be slipped over the rim in the easy manner which characterizes drop center rims.

While we have shown and described the present embodiment of the invention, it is to be understood that it may be otherwise embodied within the spirit of the invention and scope of the claims.

Having thus described our invention, what we claim and desire to protect by Letters Patent is:

1. An inner tube having diametrically disposed dynamically balanced thickened portions adapted to fit in depressed portions of a drop center rim.

2. An inner tube having similar diametrically disposed thickened portions adapted to fit in depressed portions of a drop center rim, and a valve stem disposed substantially centrally of one of said portions.

3. An inner tube comprising a plurality of similar arcuate sections disposed along the inner circumference thereof for occupying a depression in a drop center rim to the exclusion of adjacent tire beads.

4. The combination with a drop center rim and a tire, of an inner tube for inflating the tire, and having dynamically balanced diametrically opposed arcuate sections seated in the depressed portion of said rim for excluding the adjacent tire beads.

5. The combination with a drop center rim and a tire, of an inner tube for inflating the tire, having similar diametrically opposed arcuate sections seated in the depressed portion of said rim for excluding the adjacent tire beads, and a valve stem mounted in one of said portions and projecting through said rim for securing said inner tube.

6. An inner tube having similar equally spaced thickened portions adapted to fit in depressed portions of a drop center rim.

7. An inner tube having spaced dynamically balanced thickened portions adapted to fit in depressed portions of a drop center rim.

8. An inner tube having similar spaced dynamically balanced thickned portions adapted to fit in depressed portions of a drop center rim.

9. An inner tube having similar segmental thickened portions arranged along the inner circumference of the tube, the rim engaging surfaces of both the said thickened portions and the tube being formed to assume naturally a circular configuration without distortion upon inflation of the tube, said portions being adapted to be seated in the depression of a drop-center rim.

10. The combination with a drop center rim and a tire, of an inner tube for inflating the tire, and having dynamically balanced arcuate sections seated in the depressed portion of said rim for excluding the adjacent tire beads.

11. The combination with a drop center rim and a tire, of an inner tube for inflating the tire, having similar arcuate sections seated in the depressed portion of said rim for excluding the adjacent tire beads, and a valve stem mounted in one of said portions and projecting through said rim for securing said inner tube.

Signed at Detroit, in the county of Wayne, and State of Michigan, this 24th day of March, 1930.

ERNST EGER.

Signed at Detroit, in the county of Wayne, and State of Michigan, this 24th day of March, 1930.

SHELDON P. THACHER.